United States Patent
Joshi et al.

(10) Patent No.: US 7,251,755 B2
(45) Date of Patent: Jul. 31, 2007

(54) APPARATUS AND METHOD FOR MAINTAINING DATA INTEGRITY FOLLOWING PARITY ERROR DETECTION

(75) Inventors: Aniruddha P. Joshi, Chandler, AZ (US); John P. Lee, Tempe, AZ (US); Geetani R. Edirisooriya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 10/779,140

(22) Filed: Feb. 13, 2004

(65) Prior Publication Data

US 2005/0193288 A1    Sep. 1, 2005

(51) Int. Cl.
    *G06F 11/00*    (2006.01)
(52) U.S. Cl. .............................. 714/43; 714/37; 714/39
(58) Field of Classification Search ................ 714/2, 714/4, 5, 6, 15, 37, 39, 43
    See application file for complete search history.

(56) References Cited

U.S. PATENT DOCUMENTS

| | | | |
|---|---|---|---|
| 4,959,772 A | | 9/1990 | Smith et al. |
| 5,499,346 A | * | 3/1996 | Amini et al. ............... 710/311 |
| 5,511,164 A | * | 4/1996 | Brunmeier et al. ........... 714/53 |
| 5,790,870 A | * | 8/1998 | Hausauer et al. ........... 710/260 |
| 5,862,316 A | * | 1/1999 | Hagersten et al. ............ 714/15 |
| 6,012,148 A | * | 1/2000 | Laberge et al. ................ 714/2 |
| 6,081,865 A | | 6/2000 | Tavallaei et al. |
| 6,216,189 B1 | * | 4/2001 | Kim ............................ 710/113 |
| 6,622,260 B1 | * | 9/2003 | Marisetty et al. ............. 714/10 |
| 6,766,479 B2 | * | 7/2004 | Edwards, Jr. ................ 714/43 |
| 6,944,796 B2 | * | 9/2005 | Joshi et al. ................... 714/43 |
| 6,996,750 B2 | * | 2/2006 | Tetreault ...................... 714/44 |
| 2002/0073359 A1 | * | 6/2002 | Wade ......................... 714/37 |
| 2002/0099980 A1 | * | 7/2002 | Olarig ......................... 714/43 |
| 2002/0194548 A1 | * | 12/2002 | Tetreault ..................... 714/43 |
| 2003/0070111 A1 | * | 4/2003 | Riley ............................ 714/5 |

FOREIGN PATENT DOCUMENTS

WO    WO 2004/003748 A1    1/2004

OTHER PUBLICATIONS

PCT International Search Report for co-pending PCT Application No. PCT/US2005/002044, mailed Jun. 1, 2005.

* cited by examiner

*Primary Examiner*—Scott Baderman
*Assistant Examiner*—Tim Bonura
(74) *Attorney, Agent, or Firm*—Blakely, Sokoloff, Taylor & Zafman LLP (57) ABSTRACT

In some embodiments, a method and apparatus for maintaining data integrity following parity error detection are described. In one embodiment, the method includes the blockage of bus transactions in response to detection of a parity error. Once bus transactions are suspended, a parity error handler routine is invoked to perform parity error recovery according to stored transaction information regarding an error bus transaction of the detected parity error. In one embodiment, the stored information includes a bus master that caused the error, as well as an address associated with the corrupt data for which the parity error was asserted. In one embodiment, data logging is performed to track the bus masters associated with error bus transactions to enable identification of problematic or old hardware devices. Other embodiments are described and claims.

35 Claims, 11 Drawing Sheets

APPARATUS AND METHOD FOR MAINTAINING DATA INTEGRITY FOLLOWING PARITY ERROR DETECTION

FIELD OF THE INVENTION

One or more embodiments of the invention relate generally to the field of computer system design More particularly, one or more of the embodiments of the invention relates to a method and apparatus for maintaining data integrity following parity error detection.

BACKGROUND OF THE INVENTION

Communication between devices within a computer system is typically performed using one or more busses to interconnect the devices. These busses may be dedicated busses coupling to devices or non-dedicated busses that are multiplexed by a number of units and devices (e.g., bus agents). Moreover, busses within a computer system may be dedicated to transferring a specific type of information. For example, many microprocessor architectures include a three-bus system comprised of address, data and control busses for respectively transferring data, address and control signals.

A vast amount of research in architecture design is directed to increasing data throughput within computer systems. During the past decade, peripheral component interconnect (PCI) has provided a very successful general purpose input/output (I/O) interconnection standard. PCI is a general purpose I/O interconnect standard that utilizes PCI signaling technology, including a multi-drop parallel bus implementation. Unfortunately, the decade of time since the introduction of PCI has resulted in the identification of the various shortcomings of PCI, such as the relatively low clock speed, the use of delayed transactions, wait states and other deficiencies that resulted in poor performance. As a result, system architects have devised PCI-X to target deficiencies in the PCI bus protocol. Unfortunately, PCI-X retains many of the deficiencies attributed to the PCI bus protocol.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for maintaining data integrity following parity error detection are described. In one embodiment, the method includes the blockage of bus transactions in response to detection of a parity error. Once bus transactions are suspended, a parity error handler routine is invoked to perform parity error recovery according to stored transaction information regarding an error bus transaction of the detected parity error. In one embodiment, the stored transaction information includes a bus master that caused the error, as well as an address associated with the corrected data for which the parity error was asserted. In one embodiment, data logging is performed to track the bus masters associated with erroneous (error) bus transactions to enable identification of problematic or old hardware devices.

System Architecture

Figure 1:
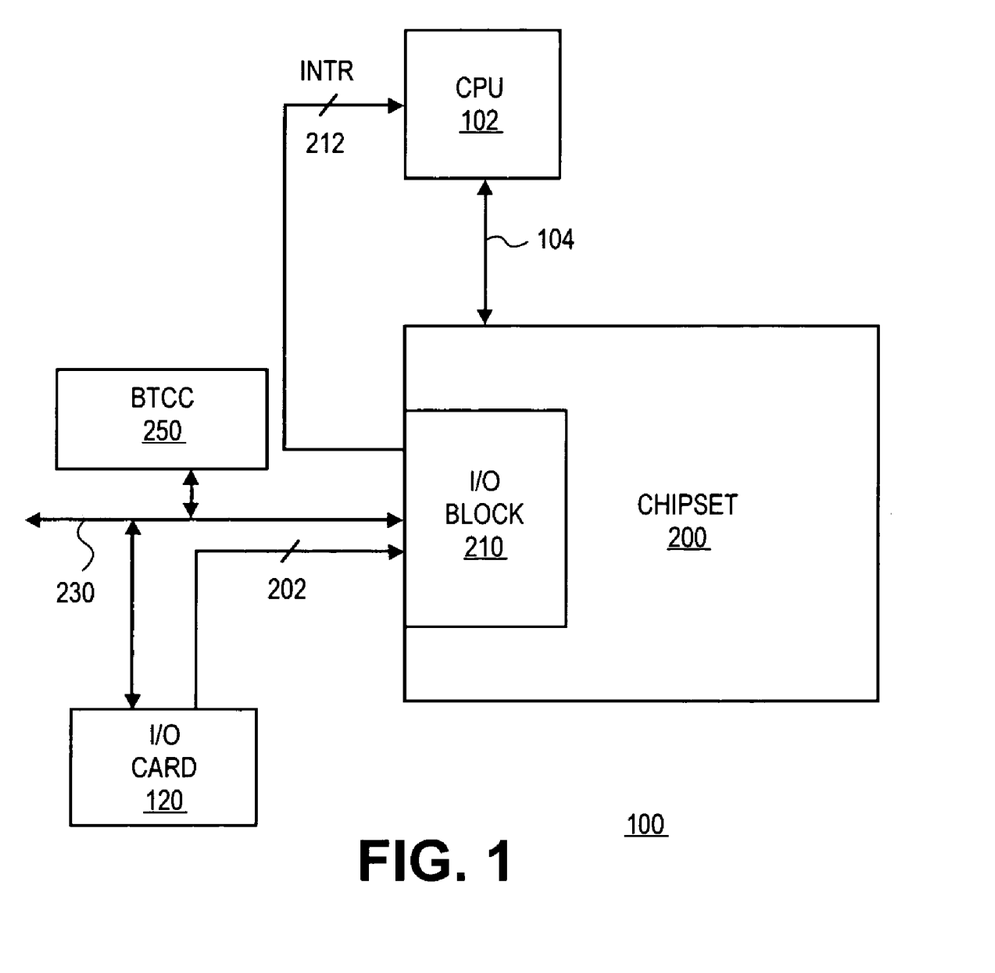
FIG. 1 is a block diagram illustrating a computer system for maintaining data integrity following parity error detection, in accordance with one embodiment.

FIG. 1 is a block diagram illustrating computer system 100 for maintaining data integrity following parity error detection, in accordance with one embodiment. As illustrated, computer system 100 includes a processor system bus (front side bus (FSB)) 102 for communicating information between a processor (CPU) 102 and a chipset 200. As described herein, the term "chipset" is used in a manner to collectively describe the various devices coupled to CPU 102 to perform desired system functionality.

In one embodiment, chipset 200 includes input/output (I/O) block 210, such as, for example, an I/O controller, I/O bridge or the like. Representatively, I/O block 210 communicates with at least I/O card 120 via I/O bus 230. As described herein, each device, or I/O card, that resides on bus 230 is referred to as a bus agent of I/O bus 230. As such, the various bus agents of I/O bus 230 are required to arbitrate for ownership of I/O bus 230 to issue bus transactions. Such arbitration is required since bus agents are generally not allowed to simultaneously drive a bus.

In one embodiment, computer system 100 includes bus transaction capture card (BTCC) 250. Representatively, BTCC 250 assists computer system 100 in maintaining data integrity following parity error detection, in accordance with one embodiment. Data integrity is paramount in server class systems, such as storage racks, telecommunication servers and the like. However, during normal, personal computer (PC) platform operation, data errors generally go undetected or result in system reset. Accordingly, regardless of the outcome, erroneous data can reach a destination (target) without being flagged as erroneous data.

As a result, the undetected data may arrive at a target bus agent, causing the platform, or system, to make decisions based on corrupted data. Accordingly, in one embodiment, BTCC 250 monitors transactions on I/O bus 230 to detect new transactions. For example, in one embodiment, I/O bus 230 may be configured according to a peripheral component interconnect (PCI) or a PCI express (PCI-X) bus protocol. In accordance with such a protocol, BTCC 250 may monitor bus 230 to identify a transaction start signal, such as, for example, a FRAME# signal according to the PCI/PCI-X bus protocol.

As further described herein, signals associated, or appended, with the pound sign (#) represent active low signals or signals that are driven low when asserted. However, as described herein, the terms "assert", "asserting", "asserted", "set", "setting", "deasserted", "deassert", "deasserting" or the like terms may refer to data signals, which are either active low or active high signals. Therefore such terms, when associated with a signal, are interchangeably used to require either active high or active low signals. Once a bus transaction is detected, BTCC 250 performs further monitoring to determine whether a parity error signal is asserted by a requester or target bus agent.

As described herein, parity detection of received data may be performed using conventional means by, for example, using even parity or odd parity, wherein one or more bits are received along with data from which a logic operation is performed. Based on an output of the logic operation, the received data may be identified as either correct or corrupted. As further described herein, a bus agent that is requesting data, is referred to herein as a "requester". Likewise, a bus agent from which data is requested, is referred to as a "completer". As further described herein, the completer of a bus transaction is referred to as a "bus master", whereas the requester, or initiator of the bus transaction, is referred to as a "target bus agent".

Referring again to FIG. 1, I/O card 120 is a target bus agent that may perform parity computation for received data. In the embodiment illustrated, I/O card 120 asserts as parity error signal 202, such as, for example, PERR#, as described by the PCI/PCI-X bus protocol. According to conventional PCI bus protocol, I/O block 210 would conventionally monitor assertion of parity error signal 202, and when asserted, would issue a hardware failure interrupt to CPU 102 (INTR 212). In one embodiment, INTR 212 may include a non-maskable interrupt (NMI) or other like hardware failure interrupt.

Accordingly, when an interrupt is issued to CPU 102, CPU 102 will generally cause a system reset, which results in the loss of corrupt data. Furthermore, although I/O card 120 may assert parity error signal 202, bus transactions along I/O bus 230 continue to issue until system reset occurs. As a result, computer system 100 may continue operation and make decisions based on or using corrupted data. Accordingly, in one embodiment, BTCC 250 captures a current bus transaction of bus 230. In one embodiment, when the current bus transaction transfers corrupt data, BTCC 250 identifies the transaction as an "error bus transaction".

In one embodiment, BTCC 250 stores transaction information, including, but not limited to, a bus master, a data corruption address and a target bus agent of the error bus transaction. In one embodiment, an interrupt handler routine, including, but not limited to an interrupt parity error handler routine of a device driver of the target bus agent, an interrupt handler routine associated with the hardware failure interrupt, or other like software may query BTCC 250 to read the transaction information for the error bus transaction. Accordingly, in contrast with conventional I/O bus protocols, transaction information for the erroneous bus transaction is saved by BTCC 250 and may be used to resolve the parity error, as well as for data logging purposes.

Figure 2:
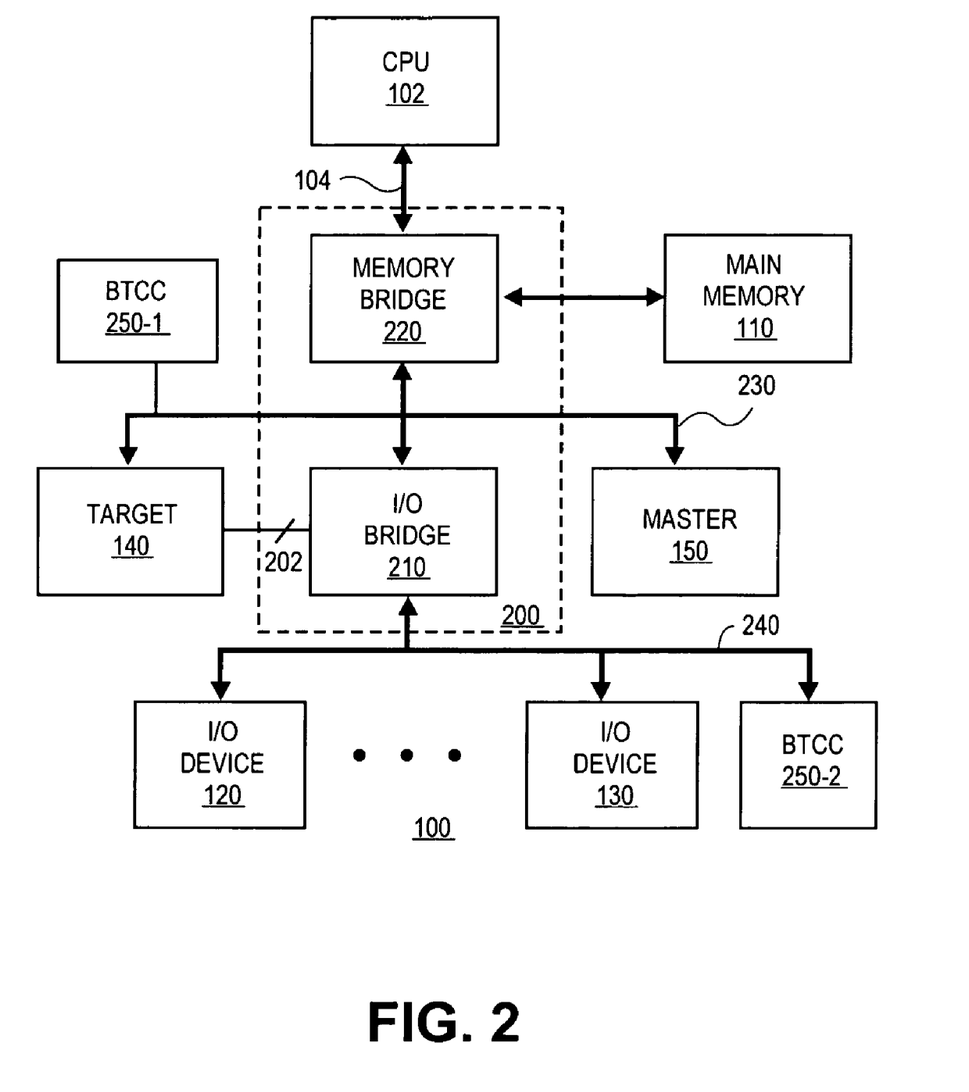
FIG. 2 is a block diagram further illustrating the computer system of FIG. 1, in accordance with one embodiment.

FIG. 2 illustrates an embodiment of computer system 100, according to a two bus configuration for maintaining data integrity following parity error detection. In the embodiment, chipset 200 is comprised of memory bridge 220 and I/O bridge 210. Accordingly, computer system 100 may function using a single chipset, as well as configurations illustrated in FIGS. 2 and 3, to include a memory bridge 220 and a separate I/O bridge 210. Representatively, main memory 110 is coupled to memory bridge 220. In one embodiment, main memory 110 may include, but is not limited to, including one or more of random access memory (RAM), dynamic RAM (DRAM) synchronous RAM (SRAM), synchronous DRAM (SDRAM), double data rate (DDR) SDRAM (DDR-SDRAM), Rambus DRAM (RDRAM) or any device capable of supporting high-speed buffering of data.

In one embodiment, BTCC 250 is provided for primary bus 230 and secondary bus 240. In the embodiment illustrated, bus agent 140 initiates a bus transaction to request data from bus agent 150. In response, bus agent 150 completes the requested transaction as a bus master, and provides the requested data to target bus agent 140. In one embodiment, target bus agent 140 performs a parity computation on received data and issues, or asserts, parity error signal 202 to I/O bridge 210 for error bus transactions.

In one embodiment, target bus agent 140 sets a status bit in a device-specific status register to indicate that a data phase parity error was detected. In one embodiment, target bus agent 140 generates an interrupt to invoke a device driver interrupt handler. In one embodiment, the handler checks the device's status to determine that a data phase parity error was detected and executes the handler's parity error handler routine. In one embodiment, the parity error handler routine is modified to query BTCC 250 to determine transaction information regarding the error bus transaction and attempt parity error recovery. In an alternate embodiment, a hardware interrupt handler is invoked to execute a parity error handler routine.

Figure 3:
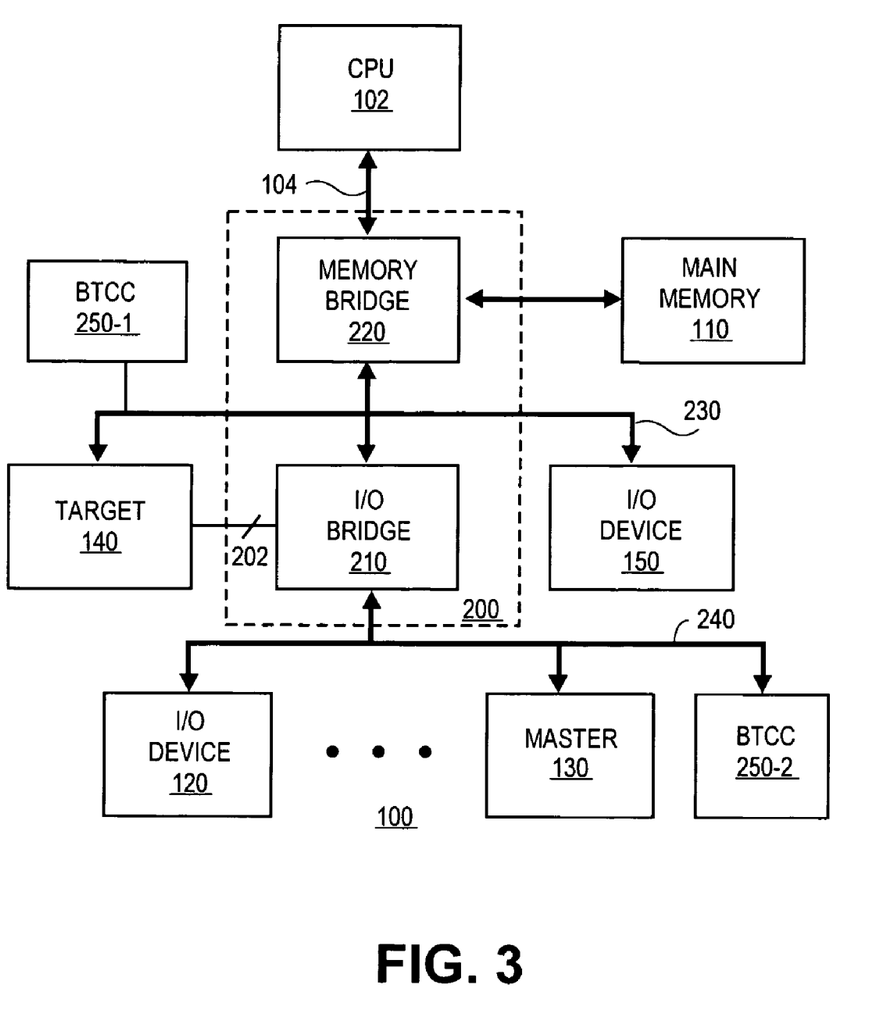
FIG. 3 is a block diagram further illustrating the computer system of FIG. 1, in accordance with one embodiment.

FIG. 3 further illustrates computer system 100 for maintaining data integrity following parity error detection, in accordance with one embodiment. As illustrated, target bus agent 140 is coupled to primary bus 230, whereas master bus agent 130 is coupled to secondary bus 240. Capture of transaction information for error bus transactions may be performed in conjunction by BTCC 250-1 and BTCC 250-2. In an alternate embodiment, BTCC 250 may be implemented within I/O bridge 210, and hence, alleviate the need for coupling a BTCC to both primary bus 230 and secondary bus 240. Representatively, BTCC is implemented as an I/O card to be coupled to a connector of either primary bus 230 or secondary bus 240.

Figure 4:
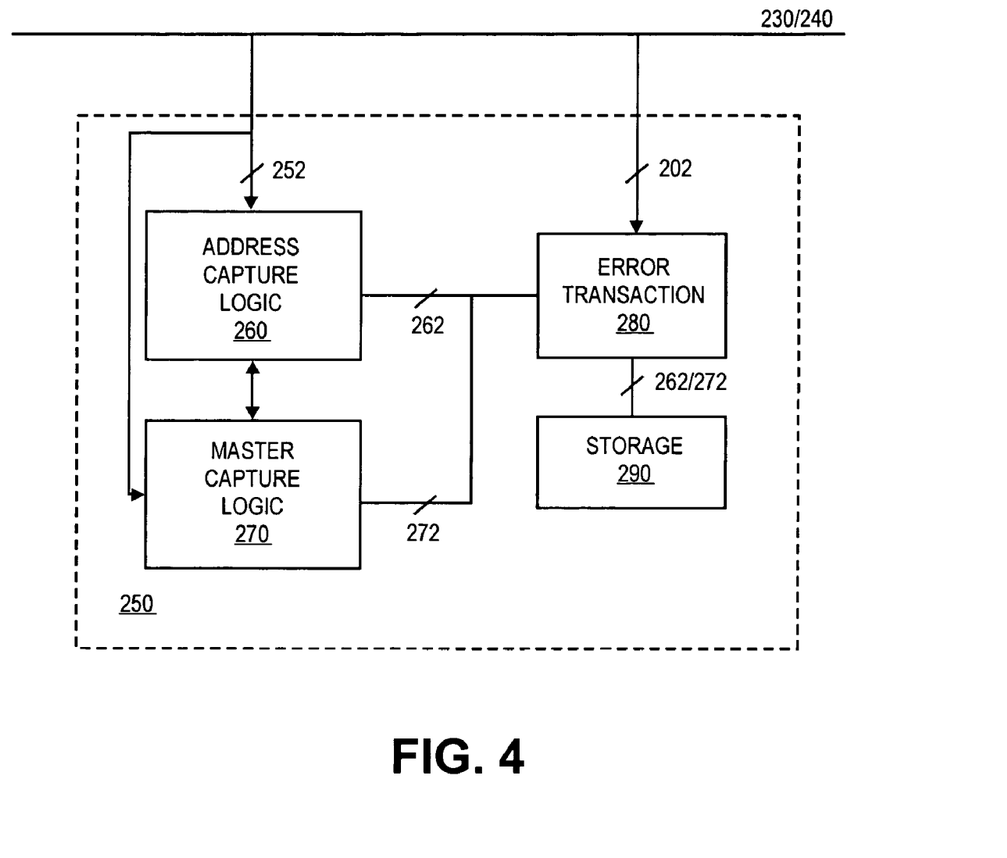
FIG. 4 is a block diagram further illustrating transaction capture card of FIGS. 1-3, in accordance with one embodiment.

FIG. 4 is a block diagram further illustrating BTCC 250 of FIGS. 1-3, in accordance with one embodiment. Representatively, BTCC 250 includes address capture logic 260, which may query I/O bus 230/240 to identify, for example, a frame signal (FRAME#) according to the PCI/PCI-X bus protocol. Once detected, address capture logic 260 determines that a current, or new, bus transaction is being asserted. Accordingly, address capture logic 260 captures an address associated with the current bus transaction. In one embodiment, master capture logic 270 also monitors I/O bus 230/240 to determine a bus master, or completer, of the current bus transaction. In addition, master capture logic 270 also determines a target, or initiator, of the bus transaction.

In one embodiment, error transaction address 262 and bus master 272 are stored within storage device 290 when a parity error signal 202 is asserted, as detected by error transaction logic 280. In one embodiment, storage 290 represents volatile memory, such as, for example, RAM, SRAM, DRAM, SDRAM, RDRAM, or other like solid-state memory. Accordingly, transaction information regarding an error bus transaction is stored within temporary storage 290 and may be queried by a parity error handler routine. In one embodiment, the parity error handler routine may also be configured to track bus masters associated with erroneous bus transactions.

Accordingly, based on the tracking of such bus masters, a parity error handler routine (e.g., data logging software) may associate an error transaction count with each bus agent coupled to a bus of computer system 100. Accordingly, the error transaction count associated with a bus agent is incremented each time the bus agent is a bus master of an error bus transaction. The error transaction count may be compared with a predetermined error transaction count within a predetermined period of time. Representatively, when a bus agent has an error transaction count, which exceeds a predetermined error transaction count, the bus agent may be identified as a problematic bus agent or hardware device. Procedural methods for implementing embodiments of the invention are now described.

Operation

Figure 5:
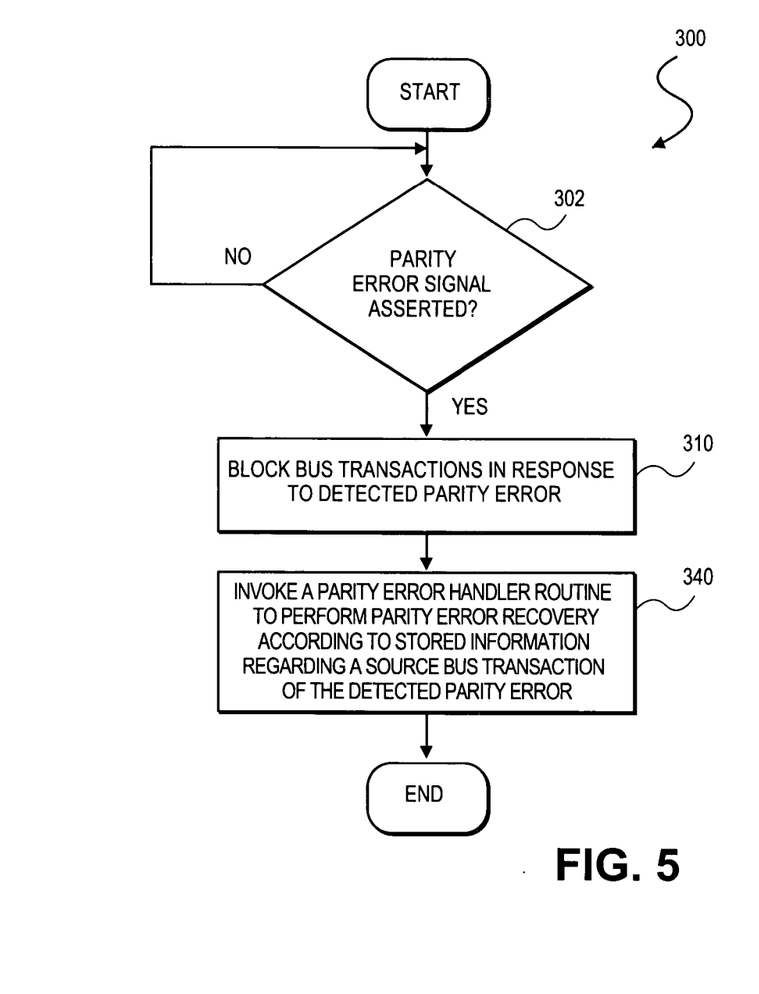
FIG. 5 is a flowchart illustrating a method for maintaining data integrity following parity error detection, in accordance with one embodiment.

FIG. 5 is a flowchart illustrating a method 300 for maintaining data integrity following parity error detection, in accordance with one embodiment. Representatively, at process block 302, it is determined whether a parity error signal is asserted. At process block 310, bus transactions are blocked in response to the detected parity error. At process block 340, a parity error handler routine is invoked to perform a parity error recovery procedure according to stored transaction information regarding an error bus transaction of the detected parity error. Accordingly, in contrast to conventional techniques, the issuance of further transactions by bus agents is prohibited until a parity error handler routine has completed one or more recovery procedures.

Figure 6:
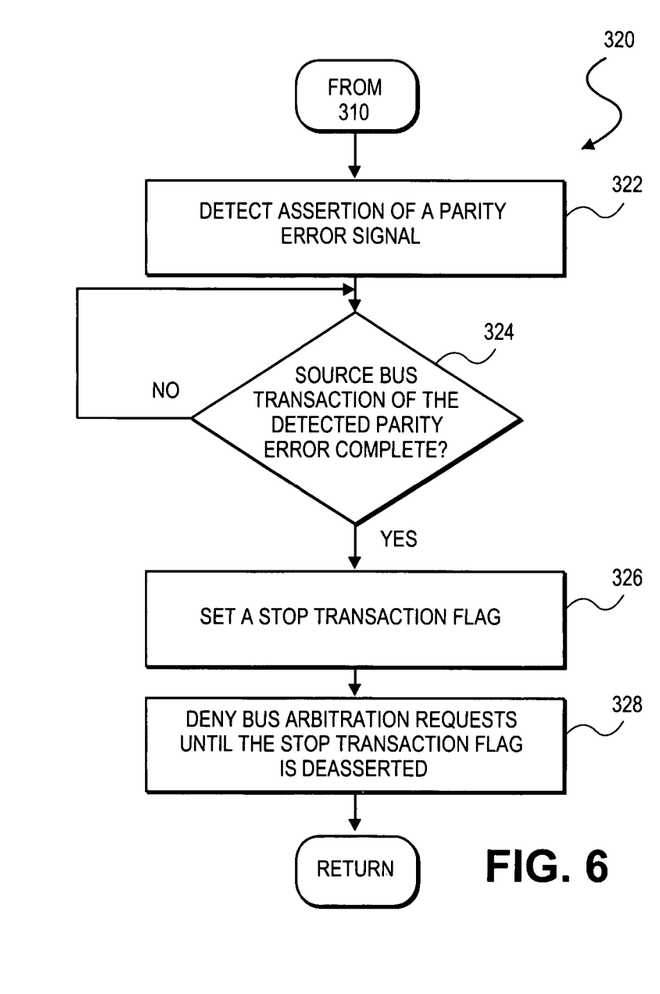
FIG. 6 is a flowchart illustrating a method for blocking bus transactions in response to a detected parity error, in accordance with one embodiment.

FIG. 6 is a flowchart illustrating a method 320 for blocking bus transactions of process block 310 of FIG. 5, in accordance with one embodiment. At process block 322, assertion of a parity error signal is detected. Once detected, at process block 324, it is determined whether the error bus transaction of the parity error is complete. Accordingly, once the error bus transaction of the detected parity error is complete, process block 326 is performed to set a stop transaction flag. Hence, at process block 328, bus arbitration requests are denied until the stop transaction flag is deasserted or reset.

Figure 7:
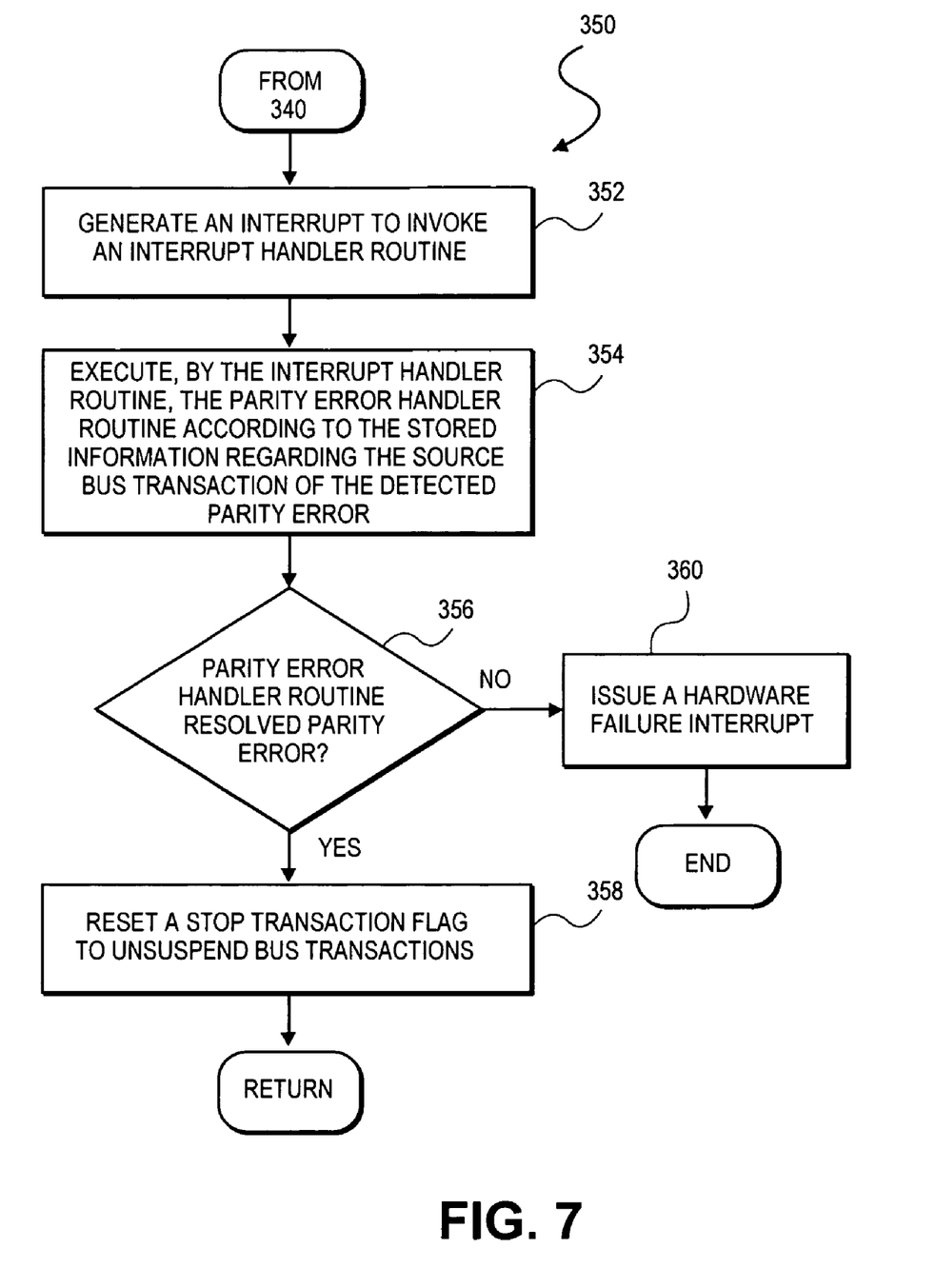
FIG. 7 is a flowchart for invoking a parity error handler routine to perform parity error recovery, in accordance with one embodiment.

FIG. 7 is a flowchart illustrating a method 350 for invoking the parity error handler of process block 330 of FIG. 5, in accordance with one embodiment. At process block 352, an interrupt is generated to invoke an interrupt handler routine. In one embodiment, the interrupt is generated by an initiator/target bus agent of the error bus transaction. At process block 354, the interrupt handler routine executes a parity error handler routine according to the stored transaction information regarding the error bus transaction of the detected parity error.

At process block 356, it is determined whether the parity error handler routine has resolved the parity error. Once the parity error has been resolved, at process block 358, the stop transaction flag is reset to unsuspend bus transactions. However, if the parity error handler routine is unable to resolve the parity error, a hardware failure interrupt, such as, for example, as non-maskable interrupt (NMI) may be issued to the system to cause system reset. In one embodiment, the parity error handler routine is executed by a hardware interrupt handler routine.

Figure 8:
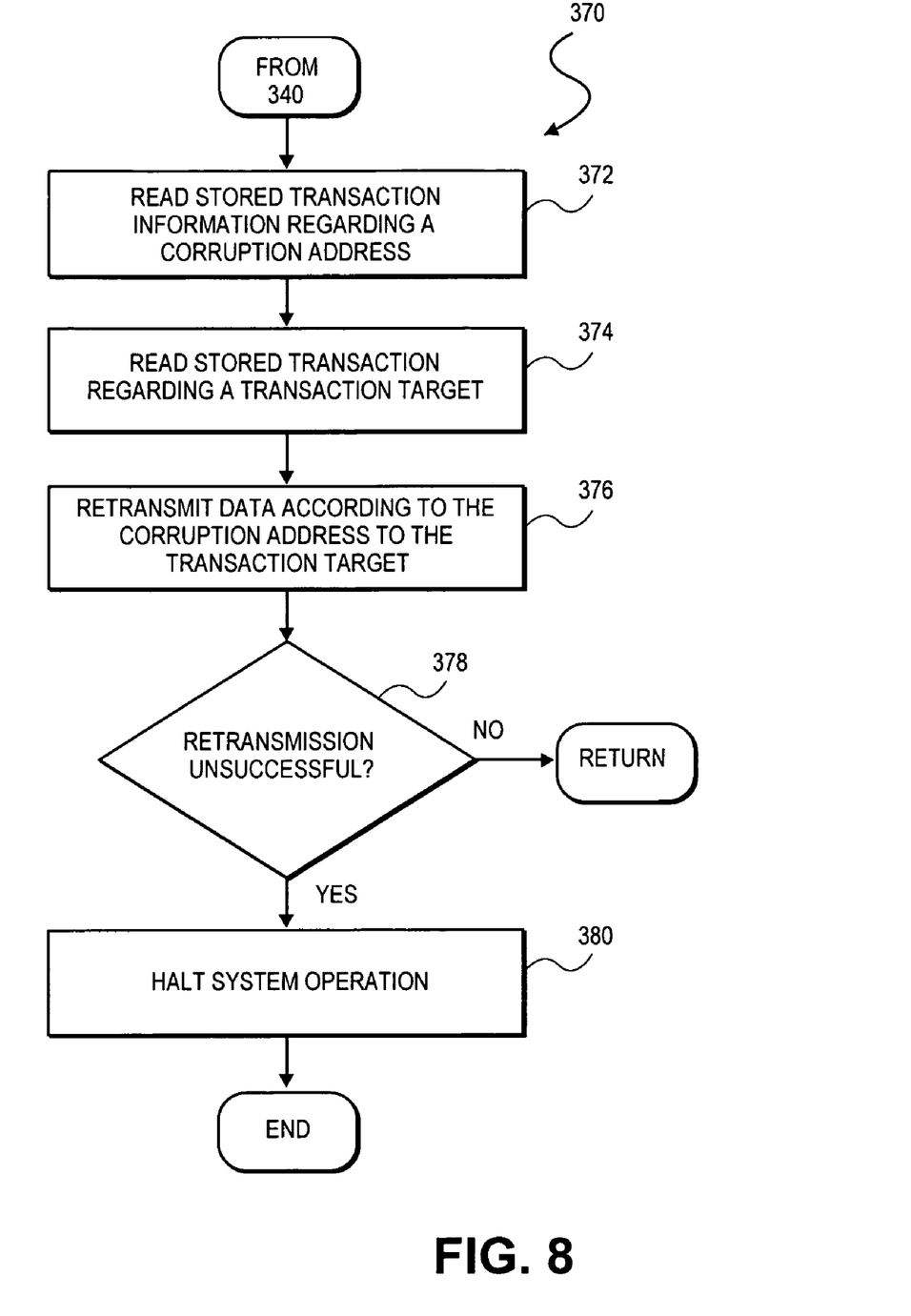
FIG. 8 is a flowchart illustrating a method for invoking a parity error handler routine to perform parity error recovery, in accordance with one embodiment.

FIG. 8 is a flowchart illustrating a method 370 for invoking the parity error handler routine of process block 340 of FIG. 5, in accordance with one embodiment. At process block 372, the stored transaction information is read regarding a corruption address of the error bus transaction. At process block 374, the stored transaction information is read regarding a target bus agent of the error bus transaction. At process block 376, transaction data is retransmitted according to the corruption address to the target bus agent. At process block 378, it is determined whether retransmission of the data is unsuccessful. When retransmission of the data is unsuccessful, at process block 380, system operation is halted. Otherwise, control flow returns to process block 340 (FIG. 5).

Figure 9:
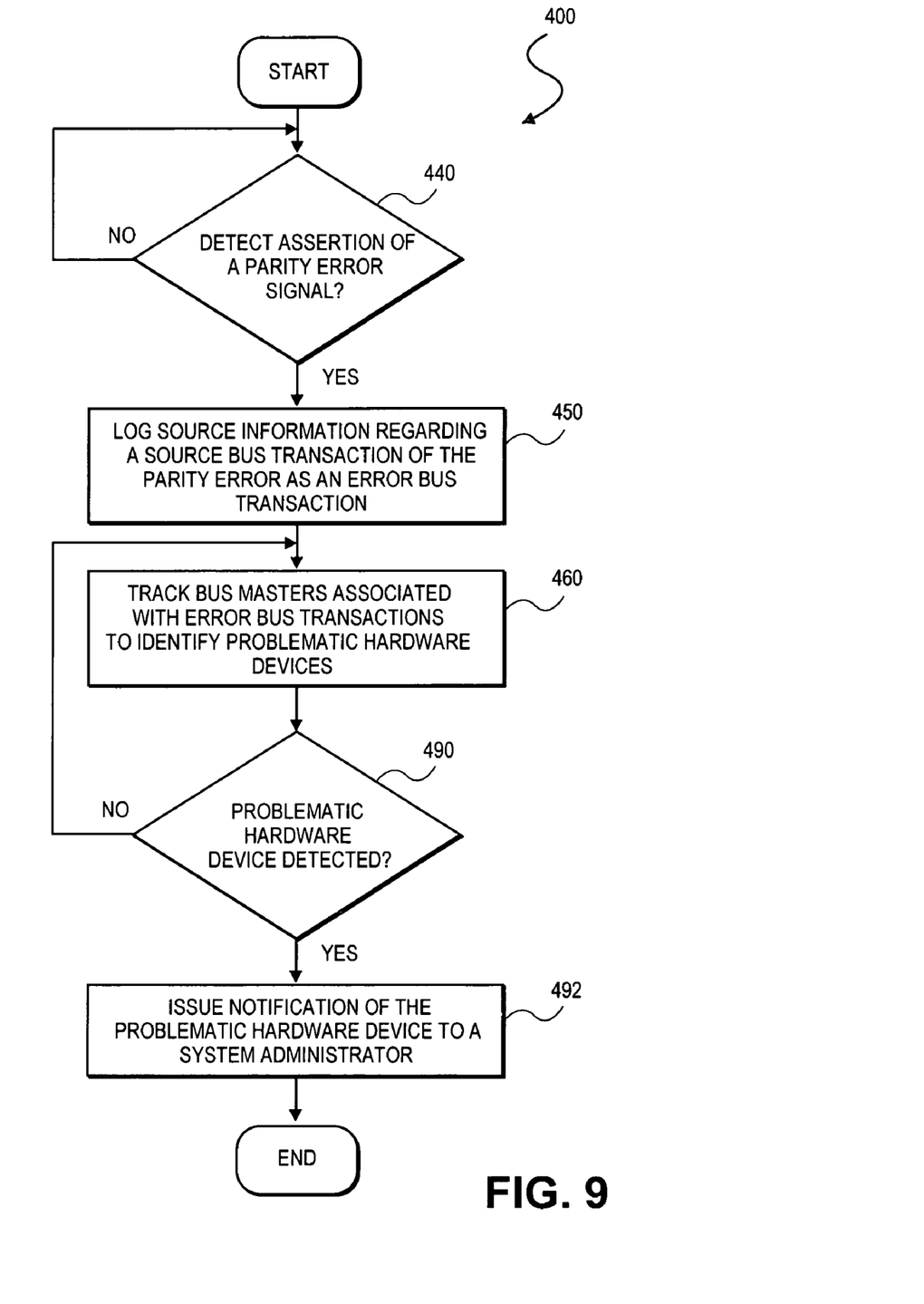
FIG. 9 is a flowchart illustrating a method for logging error bus transactions to identify problematic hardware devices, in accordance with one embodiment.

FIG. 9 is a flowchart illustrating a method 400 for tracking bus masters associated with error bus transactions to detect problematic hardware devices, in accordance with one embodiment. At process block 440, it is determined whether a parity error signal is asserted. Once asserted, at process block 450, transaction information regarding a source bus transaction of the parity error is logged as an error bus transaction. At process block 460, bus masters associated with error bus transactions are tracked to identify problematic hardware devices. At process block 490, it is determined whether a problematic hardware device is detected. When such a device is detected, at process block 492, notification of the problematic hardware device is issued to a system administrator.

Figure 10:
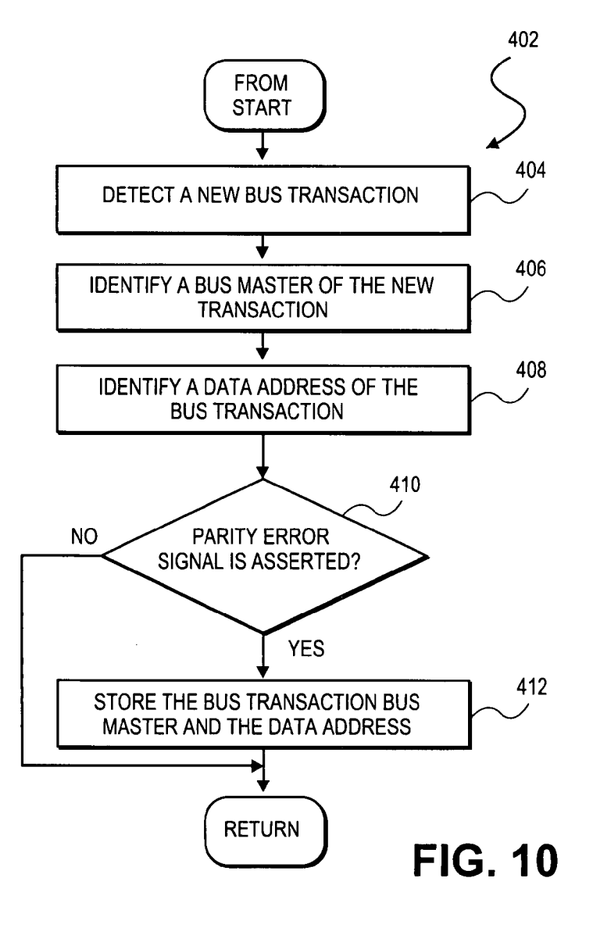
FIG. 10 is a flowchart illustrating a method for identifying error bus transactions, in accordance with one embodiment.

FIG. 10 is a flowchart illustrating a method 402, which is performed prior to detection of assertion of the parity error signal, in accordance with one embodiment. At process block 404, a new bus transaction is detected. Once detected, at process block 406, a bus master of the new bus transaction is identified. Once identified, at process block 408, a data address of the bus transaction is identified. At process block 410, it is determined whether a parity error signal is asserted. Once asserted, at process block 412, the bus transaction, bus master and data address (transaction information) are stored, such as, for example, within a storage device of a bus transaction capture card (BTCC), for example, as illustrated with reference to FIGS. 1-4.

Figure 11:
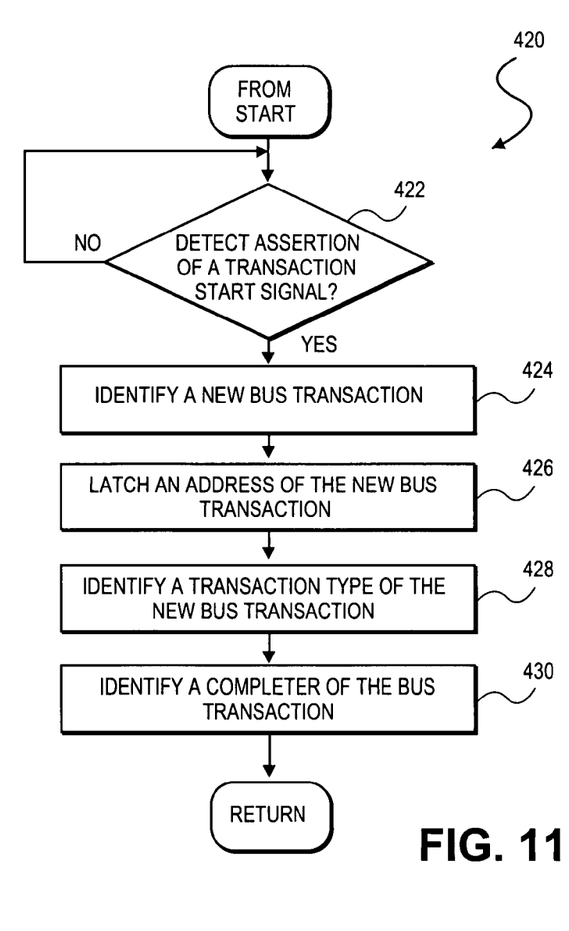
FIG. 11 is a flowchart illustrating a method for identifying error bus transactions, in accordance with one embodiment.

FIG. 11 is a flowchart illustrating a method 420 performed prior to detection of assertion of the parity error signal, at process block 440, in accordance with one embodiment. At process block 422, it is determined whether a transaction start signal is asserted. Once asserted, at process block 424, a new bus transaction is identified. Once identified, at process block 426, an address of the new bus transaction is latched. Once latched, at process block 428, a transaction type of the new bus transaction is identified. Finally, at process block 430, a completer, or bus master of the bus transaction, is identified.

Figure 12:
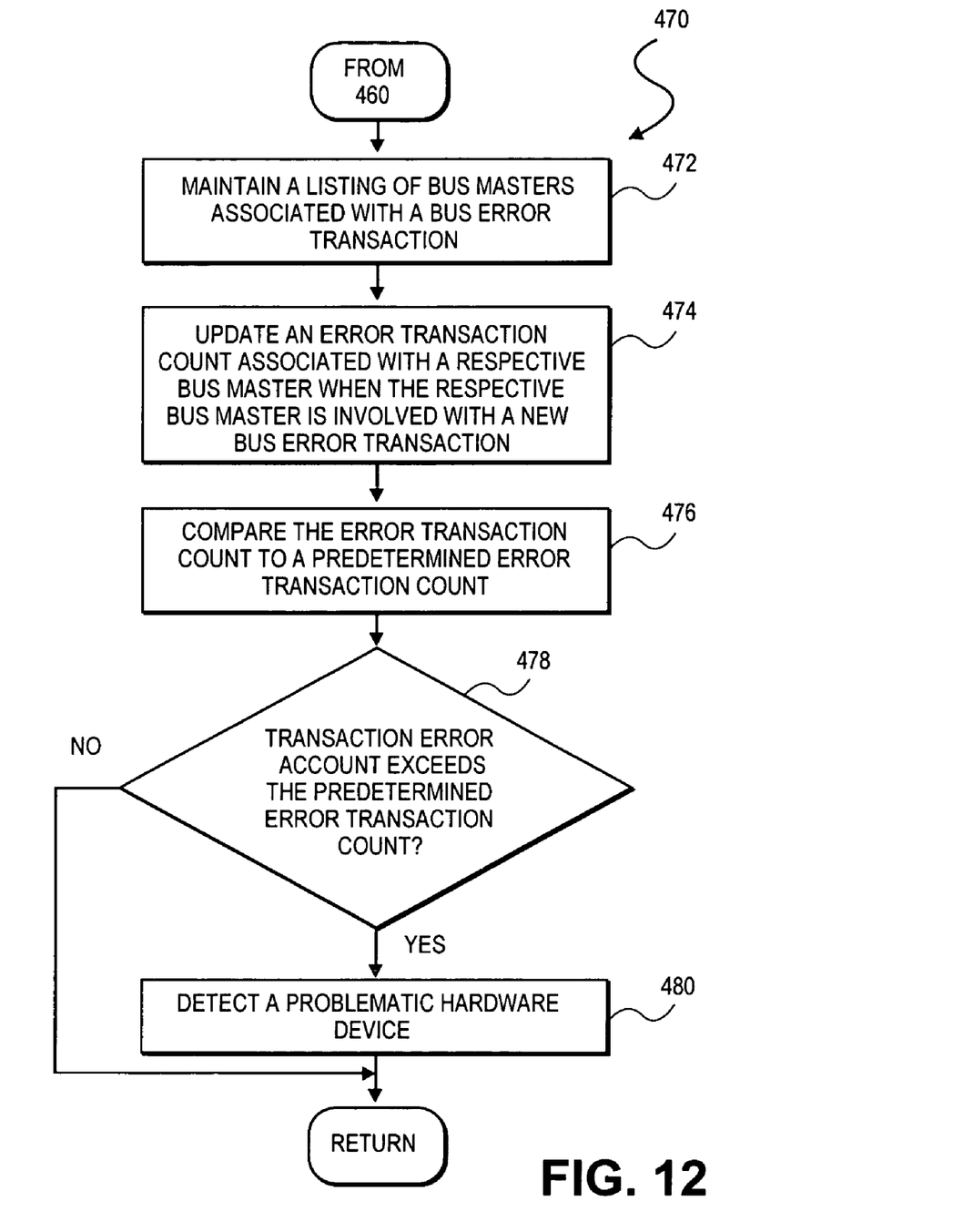
FIG. 12 is a flowchart illustrating a method for tracking bus masters associated with error bus transactions to identify problematic hardware devices, in accordance with one embodiment.

FIG. 12 is a flowchart illustrating a method 470 for tracking bus masters of process block 460 of FIG. 9, in accordance with one embodiment. At process block 472, a listing of bus masters associated with bus error transactions is maintained. At process block 474, an error transaction count associated with the respective bus master is updated when the respective bus master is involved with a new error bus transaction. At process block 470, the error transaction count is compared to a predetermined error transaction count. At process block 478, it is determined whether the transaction error count for the hardware device exceeds the predetermined error transaction count. When such is the case, at process block 480, a problematic hardware device is detected.

Accordingly, as described herein with respect to one or more embodiments, once a parity error signal is asserted, bus peripherals are denied bus ownership while an external card, such as, for example, a bus transaction capture card, stores transaction information regarding the error bus transaction that causes assertion of the parity error signal. Using the transaction information, a device driver interrupt handler routine, or a hardware interrupt hander service routine can gather transaction information for the error bus transaction to perform parity error recovery, such as retransmitting uncorrupted data. Once recovery is complete, the system may be reset or granting of bus transactions may be resumed.

Accordingly, whether implemented within a device driver or by a hardware interrupt handler service routine, the capturing of transaction information error bus transactions enables the identification of old or problematic hardware devices. Furthermore, the erroneous bus transactions are not lost according to conventional I/O bus protocol techniques and may be used to retransmit data or perform other recovery procedures, in accordance with embodiments described. Accordingly, data integrity is maintained within either PC platforms or server platforms, such that platform decisions based on corrupted data or the use of corrupted data is prohibited.

Figure 13:
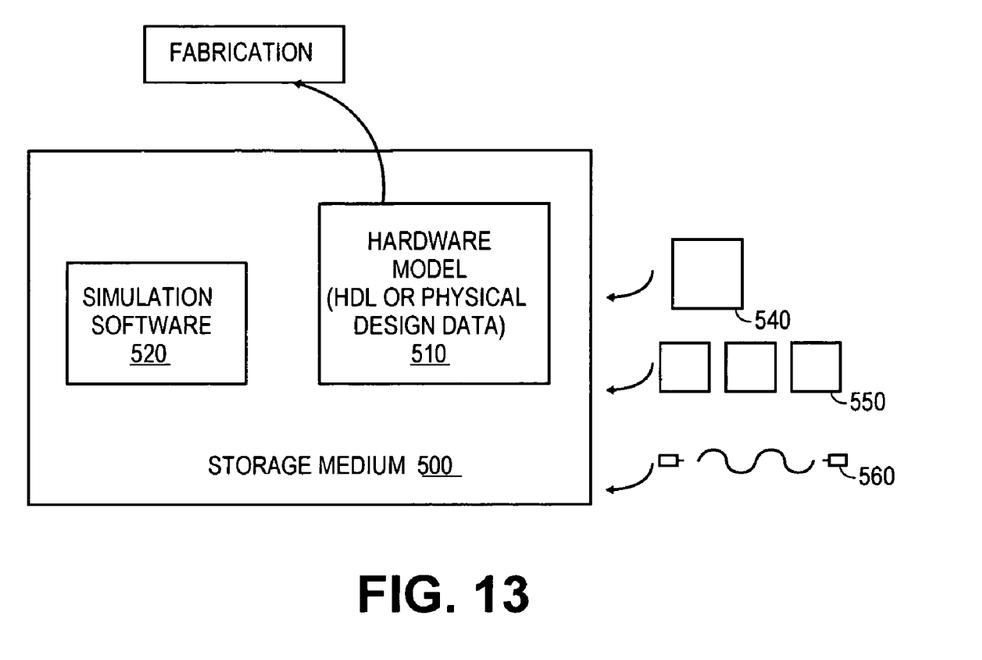
FIG. 13 is a block diagram illustrating various design representations or formats for simulation, emulation and fabrication of a design using the disclosed techniques.

FIG. 13 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite 530 to the hardware model to determine if it indeed functions as intended. In some embodiments, the simulation software is not recorded, captured or contained in the medium.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

ALTERNATE EMBODIMENTS

It will be appreciated that, for other embodiments, a different system configuration may be used. For example, while the system 100 includes a single CPU 102, for other embodiments, a multiprocessor system (where one or more processors may be similar in configuration and operation to the CPU 102 described above) may benefit from the data integrity maintenance following parity error detection of various embodiments. Further different type of system or different type of computer system such as, for example, a server, a workstation, a desktop computer system, a gaming system, an embedded computer system, a blade server, etc., may be used for other embodiments.

Having disclosed exemplary embodiments and the best mode, modifications and variations may be made to the disclosed embodiments while remaining within the scope of the embodiments of the invention as defined by the following claims.

What is claimed is:

1. A method comprising:
   blocking bus transactions in response to a detected parity error; and
   invoking a parity error handler routine to perform parity error recovery according to stored transaction information regarding a source bus transaction of the detected parity error as an error bus transaction.

2. The method of claim 1, wherein prior to suspending bus transactions, the method further comprises:
   detecting assertion of a data phase parity error signal.

3. The method of claim 1, wherein prior to blocking bus transaction, the method further comprises:
   detecting a new bus transaction;
   identifying a bus master of the new transaction;
   identifying a data address of the bus transaction; and
   storing the bus master and data address if a parity error signal is asserted.

4. The method of claim 1, wherein blocking bus transactions comprises:
   detecting assertion of a parity error signal;
   setting a stop transaction flag once the error bus transaction is complete; and
   denying bus arbitration requests until the stop transaction flag is deasserted.

5. The method of claim 1, wherein invoking the parity error handler comprises:
   generating an interrupt to invoke an interrupt handler routine; and
   executing, by the interrupt handler routine, the parity error handler routine according to the stored transaction information regarding the error bus transaction.

6. The method of claim 1, further comprising:
   (a) logging the transaction information regarding the error bus transaction;
   (b) tracking bus masters associated with error bus transactions to identify problematic hardware devices; and
   (c) when a problematic hardware device is detected as determined by (b), issuing notification of the problematic hardware device to a system administrator.

7. The method of claim 1, wherein invoking the parity error handler further comprises:
   determining whether the parity error handler routine has resolved the detected parity error; and
   resetting a stop transaction flag to unsuspend bus transactions if the error handler resolved the detected parity error.

8. The method of claim 7, further comprising:
   issuing a hardware failure interrupt if the parity error handler routine is unable to resolve the parity error.

9. The method of claim 1, wherein invoking the parity error handler further comprises:
   (a) reading the stored transaction information regarding a corruption address;

(b) reading the stored transaction regarding a transaction target;

(c) retransmitting data according to the corruption address to the transaction target; and (d) halting system operation if the retransmission of the data of (c) is unsuccessful.

10. The method of claim 1, wherein the stored transaction information includes a source bus master of the parity error and a corruption address of corrupted data having the parity error.

11. An article of manufacture including a storage device having stored thereon instructions which may be used to program a system to perform a method, comprising:

blocking bus transactions in response to a detected parity error; and invoking a parity error handler routine to perform parity error recovery according to stored transaction information regarding a source bus transaction of the detected parity error as an error bus transaction.

12. The article of manufacture of claim 11, wherein blocking bus transactions comprises:

detecting assertion of a parity error signal; and setting a stop transaction flag once the source bus transaction of the detected parity error is complete.

13. The article of manufacture of claim 11, wherein invoking the parity error handler comprises:

generating an interrupt to invoke an interrupt handler routine; and executing, by the interrupt handler routine, the parity error handler routine according to the stored information regarding the source bus transaction of the detected parity error.

14. The article of manufacture of claim 11, wherein invoking the parity error handler further comprises:

determining whether the parity error handler routine has resolved the parity error;

resetting a stop transaction flag to unsuspend bus transactions if the error handler resolved the detected parity error; and denying bus arbitration requests until the stop transaction flag is deasserted.

15. The article of manufacture of claim 11, wherein invoking the parity error handler further comprises:

(a) reading the stored transaction information regarding a corruption address;

(b) reading the stored transaction information regarding a transaction target;

(c) retransmitting data according to the corruption address to the transaction target; and (d) halting system operation if the retransmission of the data of (c) is unsuccessful.

16. A method comprising:

(a) detecting assertion of a parity error signal;

(b) logging transaction information regarding a source bus transaction of the parity error as an error bus transaction;

(c) tracking bus masters associated with error bus transactions to identify problematic hardware devices; and (d) when a problematic hardware device is detected as determined (c), issuing notification of the problematic hardware device to a system administrator.

17. The method of claim 16, wherein prior to detecting assertion of the parity error signal, the method comprises:

detecting a new bus transaction;

identifying a bus master of the new transaction;

identifying a data address of the bus transaction; and storing the bus transaction and the data address if a parity error signal is asserted.

18. The method of claim 16, wherein tracking bus masters comprises:

maintaining a listing of bus masters associated with an error bus transaction;

updating an error transaction count associated with a respective bus master when the respective bus master is involved with a new error bus transaction;

comparing the error transaction count to a predetermined error transaction count; and detecting a problematic hardware device when a transaction error count for the hardware device exceeds the predetermined error transaction count.

19. The method of claim 16, wherein prior to detecting assertion of the parity error signal, the method comprises:

detecting assertion of a transaction start signal to identify a new bus transaction;

latching an address of the new bus transaction;

identifying a transaction type of the new bus transaction; and identifying a completer of the bus transaction.

20. The method of claim 16, wherein logging further comprises:

reading a stored address of the error bus transaction; and reading device configuration register according to the stored address to determine a completer of the source bus transaction as a bus master of the error bus transaction.

21. An article of manufacture including a storage device having stored thereon instructions which may be used to program a system to perform a method, comprising:

(a) detecting assertion of a parity error signal;

(b) logging transaction information regarding a source bus transaction of the parity error as an error bus transaction;

(c) tracking bus masters associated with error bus transactions to identify problematic hardware devices; and (d) when a problematic hardware device is detected as determined (c), issuing notification of the problematic hardware device to a system administrator.

22. The article of manufacture of claim 21, wherein prior to detecting assertion of the parity error signal, the method comprises:

detecting a new bus transaction;

identifying a bus master of the new transaction;

identifying a data address of the bus transaction; and storing the bus transaction and the data address if a parity error signal is asserted.

23. The article of manufacture of claim 21, wherein tracking bus masters comprises:

maintaining a listing of bus masters associated with an error bus transaction;

updating an error transaction count associated with a respective bus master when the respective bus master is involved with a new error bus transaction;

comparing the error transaction count to a predetermined error transaction count; and detecting a problematic hardware device when a transaction error count for the hardware device exceeds a predetermined error transaction count.

24. The article of manufacture of claim 21, wherein prior to detecting assertion of the parity error signal, the method comprises:

detecting assertion of a transaction start signal to identify a new bus transaction;

latching an address of the new bus transaction;

identifying a transaction type of the new bus transaction; and identifying a completer of the bus transaction.

25. The article of manufacture of claim 21, wherein logging source information comprises:

reading a stored address of the error bus transaction; and reading device configuration register according to the source address to determine a completer of the source bus transaction as a bus master of the error bus transaction.

26. A bus agent, comprising:

a storage unit to store transaction information including a source of a bus transaction;

a controller to block bus transactions in response to a detected parity error and to invoke a parity error handler routine to perform parity error recovery according to the transaction information stored in the storage unit.

27. The bus agent of claim 26, wherein the controller is to detect assertion of a parity error signal and to set a stop transaction flag once a source bus transaction of the detected parity error is complete.

28. The bus agent of claim 26, wherein the controller is to generate an interrupt to invoke an interrupt handler routine and the interrupt handler routine is to execute the parity error handler routine according to stored transaction information regarding a source bus transaction of the detected parity error.

29. The bus agent of claim 26, wherein the bus agent is a chipset.

30. The bus agent of claim 26, wherein the bus agent is an I/O controller.

31. A system, comprising:

a bus;

at least one bus agent coupled to the bus; and a chipset coupled to bus comprising:

a controller coupled to a bus interface of the chipset, the controller to block bus transactions in response to a detected parity error, and to invoke a parity error handler routine to perform parity error recovery according to stored transaction information regarding a source bus transaction of the detected parity error as an error bus transaction.

32. The system of claim 31, further comprising:

transaction capture logic to detect assertion of a transaction start signal to identify a new bus transaction, to latch an address of the new bus transaction to identify a transaction type of the new bus transaction, to identify a completer of the bus transaction as a bus master of the bus transaction and to store at least the address and the bus master as the stored transaction information.

33. The system of claim 32, wherein the transaction capture logic comprises an input/output (I/O) card.

34. The system of claim 31, wherein the chipset comprises a memory controller.

35. The system of claim 31, wherein the chipset comprises an input/output (I/O) controller.

* * * * *